United States Patent
Powell

(10) Patent No.: US 6,574,051 B1
(45) Date of Patent: Jun. 3, 2003

(54) PORTABLE READING MAGNIFIER

(76) Inventor: Odie B. Powell, 115 W. Sunflower St., Ruleville, MS (US) 38771

(*) Notice: Subject to any disclaimer, the term of this patent is extended or adjusted under 35 U.S.C. 154(b) by 0 days.

(21) Appl. No.: 10/011,650

(22) Filed: Dec. 5, 2001

(51) Int. Cl.[7] ............ G02B 27/02; G02B 3/00; G02B 7/02
(52) U.S. Cl. ............ 359/802; 359/806; 359/809; 359/817
(58) Field of Search .................. 359/801, 802, 359/803, 804, 805, 806, 807, 808, 809, 810, 811, 817, 819, 822

(56) References Cited

U.S. PATENT DOCUMENTS

| | | | |
|---|---|---|---|
| 1,892,745 A | * | 1/1933 | Bolich .................. 359/806 |
| 2,056,093 A | | 9/1936 | Claff |
| 2,527,071 A | | 10/1950 | Pierce |
| 3,039,350 A | | 6/1962 | Gollhofer |
| 4,496,127 A | | 1/1985 | Nelson |
| 4,552,382 A | | 11/1985 | Cowden |
| 4,685,647 A | | 8/1987 | Calhoun |
| 5,048,928 A | * | 9/1991 | Davis .................. 359/809 |
| 5,729,283 A | | 3/1998 | Meyer et al. |
| 5,943,173 A | | 8/1999 | Waterhouse |
| 6,055,115 A | | 4/2000 | Davis |
| 6,116,562 A | | 9/2000 | Griffin |

* cited by examiner

Primary Examiner—Ricky Mack
(74) Attorney, Agent, or Firm—John D. Gugliotta; Olen L. York, III

(57) ABSTRACT

A magnifying system is provided to aid in the viewing or reading of book, papers or similar documents by those with impaired vision. A magnifying lens with approximate overall dimensions of eight by eleven inches is supported in an attractive wood or plastic frame of various designs and is supported by a series of four legs in each corner. The legs are adjustable in length by the use of a spring-based telescopic adjustment system that allows the user to adjust for different parameters such as strength of magnification, object size, level of vision impairment and the like. The legs also fold over against the frame in a manner similar to a card table to allow the invention to be carried in a case, a briefcase or just allow for easier transportation with reduced risk of damage.

4 Claims, 2 Drawing Sheets

PORTABLE READING MAGNIFIER

RELATED APPLICATIONS

The present invention was first described in Disclosure Document Number 491,344 filed on Mar. 20, 2001 under 35 U.S.C. §122 and 37 C.F.R. §1.14. There are no previously filed, nor currently any co-pending applications, anywhere in the world.

BACKGROUND OF THE INVENTION

1. Field of the Invention

The present invention relates generally to magnifying lenses and, more particularly, to a portable, free-standing magnifying lens particularly adapted for aiding in reading.

2. Description of the Related Art

Those of us with impaired vision when viewing printed material or objects at an "up-close" position, often rely on portable magnifiers to aid in our viewing duties. While these magnifiers certainly work, they require the user to hold them at a certain distance above the viewed item. Of course, if this is done for an extended period of time, such while reading a book or a newspaper, one's hands and arms will quickly tire. Also, if the user is using their hands to perform other tasks while viewing, such as typing or writing, the situation quickly becomes awkward and clumsy. These problems are not only limited to those with impaired vision, but to anyone who may use a portable magnifier at one time or another such as those viewing photographs with small levels of detail, those working on circuit boards with very small components, or anyone who works with items at a very small detail.

A search of the prior art did not disclose any patents that read directly on the claims of the instant invention; however, the following references were considered related.

The following patents disclose a portable magnifier stand for either writing or reading:

U.S. Pat. No. 6,116,562 issued in the name of Griffin
U.S. Pat. No. 5,729,283 issued in the name of Meyer et al.
U.S. Pat. No. 4,685,647 issued in the name of Calhoun
U.S. Pat. No. 3,039,350 issued in the name of Gollhofer
U.S. Pat. No. 2,056,093 issued in the name of Stanley The following patents describe a book holder with a magnified viewing window:

U.S. Pat. No. 4,552,382 issued in the name of Cowden
U.S. Pat. No. 4,496,127 issued in the name of Nelson
U.S. Pat. No. 2,527,071 issued in the name of Pierce
U.S. Pat. No. 6,055,115 issued in the name of Davis discloses a magnifying map viewer.

And, U.S. Pat. No. 5,943,173 issued in the name of Waterhouse describes an illuminated magnifier reading device.

Consequently, a need has been felt for providing an apparatus which provides portable magnification in a manner that can be used in a free-standing, non-hand-held manner.

SUMMARY OF THE INVENTION

It is therefore an object of the present invention to provide an improved magnifying device.

It is a feature of the present invention to provide an improved portable, free-standing magnifying lens particularly adapted for aiding in reading.

Briefly described according to one embodiment of the present invention, a magnifying system is provided to aid in the viewing or reading of book, papers or similar documents by those with impaired vision. The invention uses a magnifying lens, such as a Fresnel lens, with approximate overall dimensions of eight by eleven inches. The lens is supported in an attractive wood or plastic frame of various designs and is supported by a series of four legs in each corner. The legs are adjustable in length by the use of a spring-based telescopic adjustment system that allows the user to adjust for different parameters such as strength of magnification, object size, level of vision impairment and the like. The legs also fold over against the frame in a manner similar to a card table to allow the invention to be carried in a case, a briefcase or just allow for easier transportation with reduced risk of damage.

The use of the present invention will allow those with vision impairments the ability to read book, newspapers, and similar documents in a manner that is quick, easy and cost effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
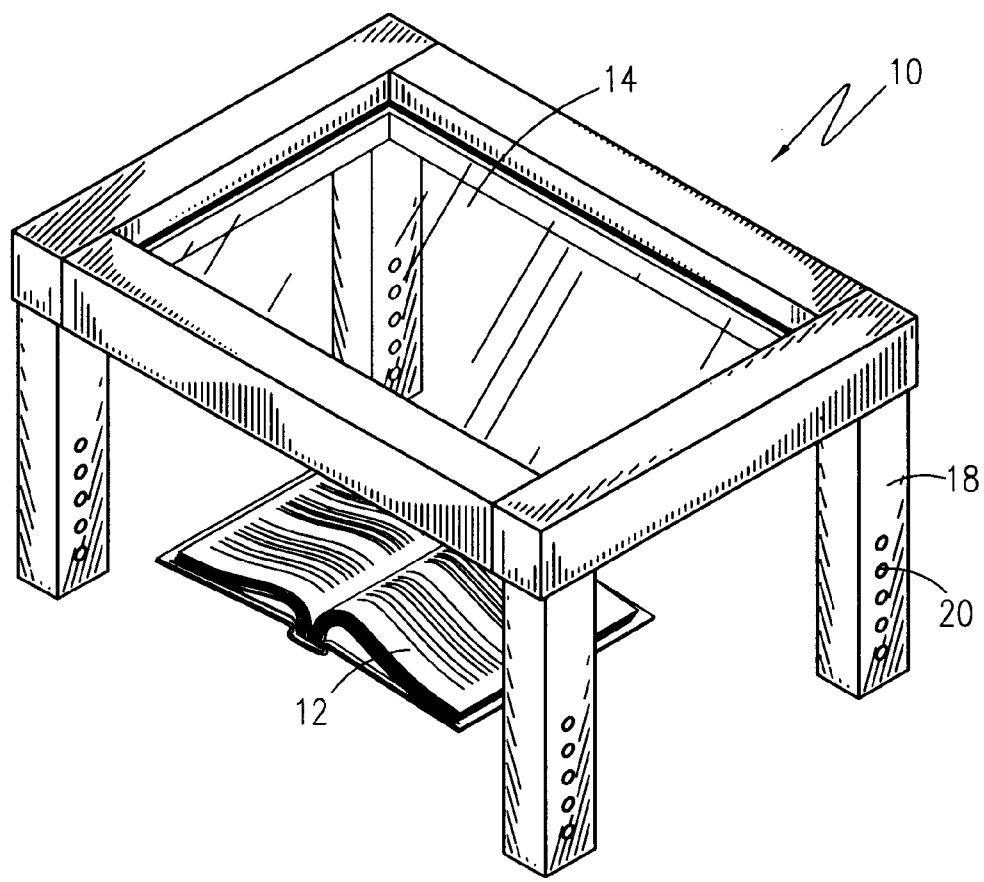
FIG. 1 is a perspective view of a portable reading magnifier according to the preferred embodiment of the present invention shown in a deployed condition.
Figure 2:
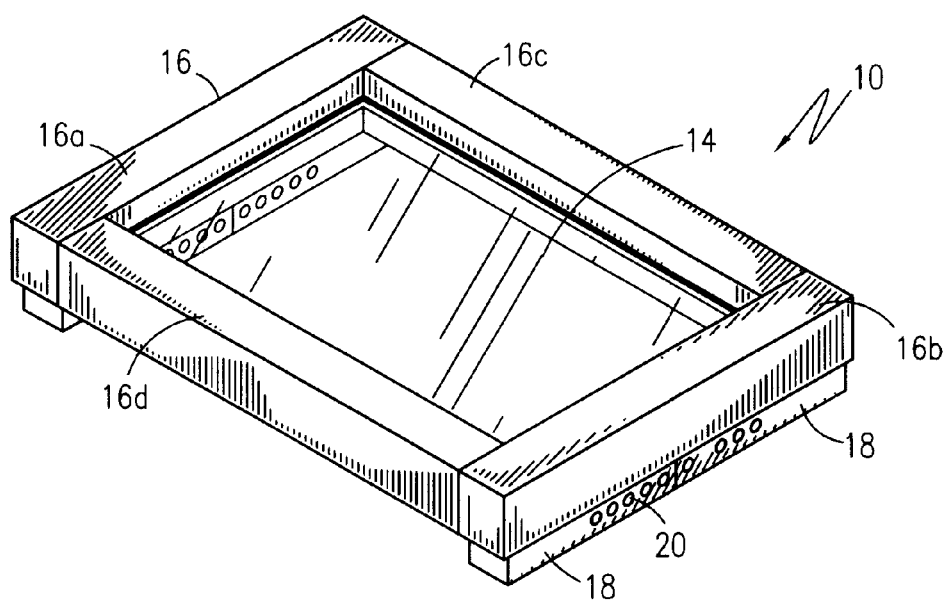
FIG. 2 is a perspective view of a portable reading magnifier according to the preferred embodiment of the present invention shown in a retracted condition.

Referring now to FIG. 1 and FIG. 2, a portable reading magnifier 10 is shown, according to the present invention, forming a magnifying system to aid in the viewing or reading of book, papers or similar documents 12 by those with impaired vision. A magnifying lens 14, such as a Fresnel lens, has approximate overall dimensions of eight by eleven inches. The lens 14 is circumscribed and supported by a frame 16. It is anticipated that the frame 16 forms an attractive wood or plastic frame of various designs and has a first side frame element 16a parallel to and opposite a second side frame element 16b, with both perpendicularly affixed to a top frame element 16c parallel to and opposite a bottom frame element 16d. The overall frame 16 is supported by a series of four legs 18 in each corner. Particularly, the first side frame element 16a has one leg 18 pivotally affixed at each end, and the second side frame element 16b similarly has one leg 18 pivotally affixed at each end. Each leg 18 is adjustable in length by the use of a spring-biased telescopic adjustment system 20 that allows the user to adjust for different parameters such as strength of magnification, object size, level of vision impairment and the like.

2. Operation of the Preferred Embodiment

To use the present invention, the magnifying system is provided to aid in the viewing or reading of book, papers or similar documents placed underneath by those with impaired vision. As shown in FIG. 2, being pivotally affixed the legs 18 fold over against the frame in a manner similar to a card table to allow the invention to be carried in a case, a briefcase or just allow for easier transportation with reduced risk of damage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A portable reading magnifier comprising:
   a frame having four corners and formed of a first side frame element parallel to and opposite a second side frame element, wherein each side frame element is perpendicularly affixed to a top frame element a bottom frame element parallel to and opposite said top frame element, said frame forming an opening;
   a magnifying lens supported within said opening and circumscribed by said frame;
   four linearly elongated legs, each said leg pivotally affixed in each corner of said frame, each said leg pivotal between a position parallel to said frame to a position perpendicular to said frame.

2. The portable reading magnifier of claim 1, wherein each said leg is vertically adjustable.

3. The portable reading magnifier of claim 2, wherein each said leg further comprises a spring-biased telescopic adjustment system that permits adjustment to different heights to account for parameters such as strength of magnification, object size, level of vision impairment and spatial relationship of viewer to object.

4. The portable reading magnifier of claim 1, wherein said magnifying lens has overall dimensions of eight inches by eleven inches, thereby accommodating a sheet of paper of standard size.

* * * * *